(12) United States Patent
Tran et al.

(10) Patent No.: US 8,229,772 B2
(45) Date of Patent: *Jul. 24, 2012

(54) METHOD AND SYSTEM FOR PROCESSING OF DATA RELATED TO INSURANCE

(75) Inventors: Oai Tran, Piscataway, NJ (US); Lisa Napolitan, West Islip, NY (US); Stanley Nutkiewicz, Fair Lawn, NJ (US); Jane Statsky, Edison, NJ (US); Richard Stoller, Brooklyn, NY (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/339,271

(22) Filed: Dec. 28, 2011

(65) Prior Publication Data

US 2012/0101856 A1   Apr. 26, 2012

Related U.S. Application Data

(63) Continuation of application No. 11/025,548, filed on Dec. 28, 2004, now Pat. No. 8,090,599.

(60) Provisional application No. 60/533,753, filed on Dec. 30, 2003.

(51) Int. Cl.
G06Q 40/00 (2012.01)
(52) U.S. Cl. .......................................................... 705/4
(58) Field of Classification Search ........................ 705/4
See application file for complete search history.

(56) References Cited

U.S. PATENT DOCUMENTS

| | | | |
|---|---|---|---|
| 4,667,336 A | 5/1987 | Best | |
| 4,975,840 A | 12/1990 | DeTore et al. | |
| 5,182,705 A | 1/1993 | Barr et al. | |
| 5,557,514 A | 9/1996 | Seare et al. | |
| 5,619,991 A | 4/1997 | Sloane | |
| 5,635,693 A | 6/1997 | Benson et al. | |
| 5,680,329 A | 10/1997 | Lloyd et al. | |

(Continued)

FOREIGN PATENT DOCUMENTS

CA  2415013 A1  6/2004

(Continued)

OTHER PUBLICATIONS

Ruling, Karl G., The Rise of the Ethernet, TCI, 30(3), 52, Mar. 1996, 2 pages.

(Continued)

Primary Examiner — Muriel Tinkler
(74) Attorney, Agent, or Firm — Howard IP Law Group, PC

(57) ABSTRACT

This invention relates generally to a computer system and method for integrating insurance policy underwriting. In one aspect it integrates the older legacy insurance policy generating systems to on line systems where users access the system through browsers. The computer system to perform the process of underwriting, rating, quoting, binding, and booking an insurance policy includes browsers, data bases, processors and a dispatcher that parses the information to select an insurance process. Suitable software programs review messages received from users to determine if certain messages are less than a prescribed limit. If a message is greater than the limit, then the message is parsed into a header information and one or more data fields whereby the header information is provided to a legacy processor and to policy generation software for further creation of policy related information and documentation.

20 Claims, 12 Drawing Sheets

U.S. PATENT DOCUMENTS

| | | | |
|---|---|---|---|
| 5,772,585 A | 6/1998 | Lavin et al. | |
| 5,794,216 A | 8/1998 | Brown | |
| 5,797,134 A | 8/1998 | McMillan et al. | |
| 5,819,228 A | 10/1998 | Spiro | |
| 5,825,283 A | 10/1998 | Camhi | |
| 5,835,897 A | 11/1998 | Dang | |
| 5,842,148 A | 11/1998 | Prendergast et al. | |
| 5,845,254 A | 12/1998 | Lockwood et al. | |
| 5,890,129 A | 3/1999 | Spurgeon | |
| 5,933,809 A | 8/1999 | Hunt et al. | |
| 5,950,150 A | 9/1999 | Lloyd et al. | |
| 5,956,690 A | 9/1999 | Haggerson et al. | |
| 5,970,464 A | 10/1999 | Apte et al. | |
| 5,974,389 A | 10/1999 | Clark et al. | |
| 5,991,729 A | 11/1999 | Barry et al. | |
| 6,035,276 A | 3/2000 | Newman et al. | |
| 6,064,970 A | 5/2000 | McMillan et al. | |
| 6,067,488 A | 5/2000 | Tano | |
| 6,078,857 A | 6/2000 | Jung et al. | |
| 6,112,183 A | 8/2000 | Swanson et al. | |
| 6,112,225 A | 8/2000 | Kraft et al. | |
| 6,154,658 A | 11/2000 | Caci | |
| 6,163,277 A | 12/2000 | Gehlot | |
| 6,182,048 B1 | 1/2001 | Osborn et al. | |
| 6,204,757 B1 | 3/2001 | Evans et al. | |
| 6,211,777 B1 | 4/2001 | Greenwood et al. | |
| 6,223,125 B1 | 4/2001 | Hall | |
| 6,246,934 B1 | 6/2001 | Otake et al. | |
| 6,283,761 B1 | 9/2001 | Joao | |
| 6,307,965 B1 | 10/2001 | Aggarwal et al. | |
| 6,324,516 B1 | 11/2001 | Shults et al. | |
| 6,341,265 B1 | 1/2002 | Provost et al. | |
| 6,343,271 B1 | 1/2002 | Peterson et al. | |
| 6,389,340 B1 | 5/2002 | Rayner | |
| 6,438,533 B1 | 8/2002 | Spackman et al. | |
| 6,502,020 B2 | 12/2002 | Lang | |
| 6,529,876 B1 | 3/2003 | Dart et al. | |
| 6,563,423 B2 | 5/2003 | Smith | |
| 6,583,734 B2 | 6/2003 | Bates et al. | |
| 6,594,579 B1 | 7/2003 | Lowrey et al. | |
| 6,598,026 B1 * | 7/2003 | Ojha et al. | 705/80 |
| 6,611,740 B2 | 8/2003 | Lowrey et al. | |
| 6,611,846 B1 | 8/2003 | Stoodley | |
| 6,636,790 B1 | 10/2003 | Lightner et al. | |
| 6,643,578 B2 | 11/2003 | Levine | |
| 6,655,583 B2 | 12/2003 | Walsh et al. | |
| 6,684,189 B1 | 1/2004 | Ryan et al. | |
| 6,710,738 B2 | 3/2004 | Allen, Jr. | |
| 6,732,031 B1 | 5/2004 | Lightner et al. | |
| 6,735,525 B1 | 5/2004 | Murphy | |
| 6,754,485 B1 | 6/2004 | Obradovich et al. | |
| 6,756,915 B2 | 6/2004 | Choi | |
| 6,757,898 B1 | 6/2004 | Ilsen et al. | |
| 6,767,330 B2 | 7/2004 | Lavery et al. | |
| 6,768,417 B2 | 7/2004 | Kuragaki et al. | |
| 6,792,410 B1 | 9/2004 | Donovan et al. | |
| 6,795,759 B2 | 9/2004 | Doyle | |
| 6,823,258 B2 | 11/2004 | Ukai et al. | |
| 6,826,536 B1 | 11/2004 | Forman | |
| 6,832,141 B2 | 12/2004 | Skeen et al. | |
| 6,839,305 B2 | 1/2005 | Perlman et al. | |
| 6,853,956 B2 | 2/2005 | Ballard, Jr. et al. | |
| 6,868,339 B2 | 3/2005 | Murphy et al. | |
| 6,868,386 B1 | 3/2005 | Henderson et al. | |
| 6,871,199 B1 | 3/2005 | Binnig et al. | |
| 6,879,959 B1 | 4/2005 | Chapman et al. | |
| 6,886,016 B2 | 4/2005 | Hansen et al. | |
| 6,915,265 B1 | 7/2005 | Johnson | |
| 6,915,266 B1 | 7/2005 | Saeed et al. | |
| 6,920,379 B2 | 7/2005 | Miyamoto | |
| 6,925,425 B2 | 8/2005 | Remboski et al. | |
| 6,931,309 B2 | 8/2005 | Phelan et al. | |
| 6,957,133 B1 | 10/2005 | Hunt et al. | |
| 6,957,218 B1 | 10/2005 | Wyatt | |
| 6,965,326 B2 | 11/2005 | Allison | |
| 6,968,453 B2 | 11/2005 | Doyle et al. | |
| 6,973,319 B2 | 12/2005 | Ormson | |
| 6,977,612 B1 | 12/2005 | Bennett | |
| 6,985,922 B1 | 1/2006 | Bashen et al. | |
| 6,987,964 B2 | 1/2006 | Obradovich et al. | |
| 7,017,142 B1 | 3/2006 | Ehnebuske et al. | |
| 7,069,118 B2 | 6/2006 | Coletrane et al. | |
| 7,089,202 B1 * | 8/2006 | McNamar et al. | 705/35 |
| 7,343,310 B1 * | 3/2008 | Stender | 705/4 |
| 7,610,210 B2 * | 10/2009 | Helitzer et al. | 705/4 |
| 8,041,617 B1 * | 10/2011 | Stender | 705/35 |
| 2001/0016872 A1 | 8/2001 | Kusuda | |
| 2001/0037224 A1 | 11/2001 | Eldridge et al. | |
| 2001/0039509 A1 | 11/2001 | Dar et al. | |
| 2001/0044733 A1 | 11/2001 | Lee et al. | |
| 2002/0002475 A1 * | 1/2002 | Freedman et al. | 705/4 |
| 2002/0007284 A1 | 1/2002 | Schurenberg et al. | |
| 2002/0013717 A1 | 1/2002 | Ando et al. | |
| 2002/0019754 A1 | 2/2002 | Peterson et al. | |
| 2002/0022976 A1 | 2/2002 | Hartigan | |
| 2002/0035529 A1 | 3/2002 | Tooke, III | |
| 2002/0052765 A1 | 5/2002 | Taylor | |
| 2002/0055861 A1 | 5/2002 | King et al. | |
| 2002/0077869 A1 | 6/2002 | Doyle et al. | |
| 2002/0091550 A1 * | 7/2002 | White et al. | 705/4 |
| 2002/0103622 A1 | 8/2002 | Burge | |
| 2002/0111725 A1 | 8/2002 | Burge | |
| 2002/0111833 A1 | 8/2002 | Dick | |
| 2002/0111835 A1 | 8/2002 | Hele et al. | |
| 2002/0115423 A1 | 8/2002 | Hatae et al. | |
| 2002/0128882 A1 | 9/2002 | Nakagawa et al. | |
| 2002/0148893 A1 | 10/2002 | Walsh et al. | |
| 2002/0165739 A1 | 11/2002 | Guyan et al. | |
| 2002/0173885 A1 | 11/2002 | Lowrey et al. | |
| 2002/0178033 A1 | 11/2002 | Yoshioka et al. | |
| 2002/0188467 A1 | 12/2002 | Eke | |
| 2002/0198741 A1 | 12/2002 | Randazzo | |
| 2003/0009357 A1 | 1/2003 | Pish | |
| 2003/0028406 A1 | 2/2003 | Herz et al. | |
| 2003/0033057 A1 | 2/2003 | Kallestad | |
| 2003/0046107 A1 | 3/2003 | Eisenberg et al. | |
| 2003/0061150 A1 | 3/2003 | Kocher | |
| 2003/0083903 A1 | 5/2003 | Myers | |
| 2003/0083972 A1 | 5/2003 | Williams | |
| 2003/0093302 A1 * | 5/2003 | Quido et al. | 705/4 |
| 2003/0093366 A1 | 5/2003 | Halper et al. | |
| 2003/0120516 A1 | 6/2003 | Perednia | |
| 2003/0139948 A1 | 7/2003 | Strech | |
| 2003/0154009 A1 | 8/2003 | Basir et al. | |
| 2003/0158758 A1 | 8/2003 | Kanazawa et al. | |
| 2003/0171956 A1 | 9/2003 | Cox et al. | |
| 2003/0187702 A1 | 10/2003 | Bonissone et al. | |
| 2003/0187704 A1 | 10/2003 | Hashiguchi et al. | |
| 2003/0221118 A1 | 11/2003 | Walker | |
| 2003/0229522 A1 * | 12/2003 | Thompson et al. | 705/4 |
| 2003/0233261 A1 | 12/2003 | Kawahara et al. | |
| 2003/0233278 A1 | 12/2003 | Marshall | |
| 2003/0233323 A1 | 12/2003 | Bilski et al. | |
| 2004/0019506 A1 | 1/2004 | Struchtemeyer et al. | |
| 2004/0036601 A1 | 2/2004 | Obradovich | |
| 2004/0039611 A1 | 2/2004 | Hong et al. | |
| 2004/0102172 A1 | 5/2004 | Hendin | |
| 2004/0117217 A1 | 6/2004 | Reber et al. | |
| 2004/0139034 A1 | 7/2004 | Farmer | |
| 2004/0148201 A1 | 7/2004 | Smith et al. | |
| 2004/0153362 A1 | 8/2004 | Bauer et al. | |
| 2004/0153762 A1 | 8/2004 | Flynn et al. | |
| 2004/0181495 A1 | 9/2004 | Grush | |
| 2004/0215494 A1 | 10/2004 | Wahlbin et al. | |
| 2004/0225535 A1 | 11/2004 | Bond, Jr. et al. | |
| 2004/0243450 A1 | 12/2004 | Bernard, Jr. et al. | |
| 2004/0249557 A1 | 12/2004 | Harrington et al. | |
| 2004/0249679 A1 | 12/2004 | Henderson et al. | |
| 2004/0260577 A1 | 12/2004 | Dahlin et al. | |
| 2004/0260579 A1 | 12/2004 | Tremiti | |
| 2004/0267577 A1 | 12/2004 | Nakai | |
| 2005/0038682 A1 | 2/2005 | Gandee et al. | |
| 2005/0055248 A1 | 3/2005 | Helitzer et al. | |
| 2005/0055249 A1 | 3/2005 | Helitzer et al. | |
| 2005/0065682 A1 | 3/2005 | Kapadia et al. | |
| 2005/0070299 A1 | 3/2005 | Caspi et al. | |
| 2005/0071202 A1 | 3/2005 | Kendrick | |

| | | | |
|---|---|---|---|
| 2005/0075067 | A1 | 4/2005 | Lawson et al. |
| 2005/0091175 | A9 | 4/2005 | Farmer |
| 2005/0102172 | A1 | 5/2005 | Sirmans, Jr. |
| 2005/0108065 | A1 | 5/2005 | Dorfstatter |
| 2005/0174217 | A1 | 8/2005 | Basir et al. |
| 2005/0192730 | A1 | 9/2005 | Churchill et al. |
| 2005/0216583 | A1 | 9/2005 | Cole et al. |
| 2005/0273417 | A1* | 12/2005 | Budish .................... 705/37 |
| 2005/0278082 | A1 | 12/2005 | Weekes |
| 2005/0285748 | A1 | 12/2005 | Pedraza et al. |
| 2006/0000420 | A1 | 1/2006 | Davies |
| 2006/0009289 | A1 | 1/2006 | McCarten et al. |
| 2006/0033625 | A1 | 2/2006 | Johnson et al. |
| 2006/0036473 | A1 | 2/2006 | Taylor |
| 2006/0053038 | A1 | 3/2006 | Warren et al. |

FOREIGN PATENT DOCUMENTS

| | | |
|---|---|---|
| EP | 1160701 A1 | 5/2001 |
| EP | 1160707 A1 | 12/2001 |
| EP | 1241599 A1 | 9/2002 |
| EP | 1145163 B1 | 5/2003 |
| EP | 1313043 A1 | 5/2003 |
| EP | 1544771 A1 | 6/2005 |
| EP | 1583013 A1 | 10/2005 |
| JP | 2001118175 A | 4/2001 |
| JP | 2001319051 A | 11/2001 |
| JP | 2002092764 A | 3/2002 |
| JP | 2002133117 A | 5/2002 |
| JP | 2002183456 A | 6/2002 |
| JP | 2002329071 A | 11/2002 |
| JP | 2002109229 A | 12/2002 |
| JP | 2002373259 A | 12/2002 |
| JP | 2003131905 A | 5/2003 |
| JP | 2003131901 A | 9/2003 |
| JP | 2004013234 A | 1/2004 |
| JP | 2004017901 A | 1/2004 |
| JP | 2004059013 A | 2/2004 |
| JP | 2004078393 A | 3/2004 |
| JP | 2004240688 A | 8/2004 |
| WO | 91/15817 A1 | 10/1991 |
| WO | 99/21116 A1 | 4/1999 |
| WO | 01/04821 A1 | 1/2001 |
| WO | 01/11501 A1 | 2/2001 |
| WO | 01/63445 A2 | 8/2001 |
| WO | 01/63534 A2 | 8/2001 |
| WO | 03/058381 A1 | 7/2003 |
| WO | 03/065268 A1 | 8/2003 |
| WO | 03/090130 A1 | 10/2003 |
| WO | 04/100043 A1 | 11/2004 |
| WO | 2004100024 A1 | 11/2004 |

OTHER PUBLICATIONS

Detmer, Don, "Integrated Personal Health Records: Transformative Tools for Consumer-Centric Care", BMC Medical Informatics and Decision Making, Oct. 6, 2008, vol. 8.

Tanner, Jill et al., "A Core Component-based Modelling Approach for Achieving e-Business Semantics Interoperability", Journal of Theoretical and Applied Electronic Commerce Research, Dec. 2008, 1-16, vol. 3, Issue 3.

M2 Presswire, "Actuate: Actuate launches new division to tap J2EE application development market; Reporting engines delivers crucial reporting tools to 1.5 million Java developers", Coventry, Feb. 5, 2003, p. 1.

Nguyen, Lam et al., "DADOS-Prospective: an open source application for Web-based prospective data collection", Source Code for Biology and Medicine, Nov. 13, 2006, vol. 1.

Apte et al., "Business Applications of Data Mining", Communications of the ACM, vol. 45, No. 8, Publisher: ACM, pp. 49-53, Aug. 2002.

Apte et al., "Insurance Risk Modeling Using Data Mining Technology", IBM Thomas J. Watson Res. Center, Yorktown Heights, NY, USA, Conference: PADD99. Proceedings of the Third International Conference on the Practical Application of Knowledge Discovery and Data Mining, Publisher: Practical Application Company, Blackpool, UK, 209 pages, 1999.

Dorn et al., "Insurance Industry Databases", Database: (Weston), vol. 21, No. 5, pp. 68-71, Oct./Nov. 1998.

Foran, D. J. et al., "A Distributed Health Information Network for Consultative Services in Surgical Pathology", IEEE 17th annual conference in Engineering in medicine and biology society, vol. 1, pp. 751-752, 1995.

Gallagher, Cecily "Risk Classification Aided by New Software Tool", National Underwriter, Property & Casualty Risk Benefits and Management, No. 17, p. 19, Apr. 27, 1992.

Practice 2000 for medical & dental practices, Abaki Pty ltd., 13 pages; 1994-2003.

Saha, "The New Age Electronic Patient Record System", IEEE Biomedical Engineering Conference, pp. 134-137, Apr. 1995.

IrisNet: The 'Seeing' Internet, www.intel.com, 2005.

Denise Dubie, Mgmt. standards: Keeping an open mind. Network World, Jun. 30, 2003, 20(26),p. 29.

John M Covaleski. Banks buy into XBRL; seek CPAs to help clients move to new format. Accounting Today, Feb. 2002, 16(3), p. 3, 3 pages.

U.S. Bancorp Annual Report—1990. ProQuest Annual Reports, Mar. 1, 1991, I, 71 pages.

* cited by examiner

FIG 12

METHOD AND SYSTEM FOR PROCESSING OF DATA RELATED TO INSURANCE

CROSS-REFERENCE TO RELATED APPLICATIONS

This application is a continuation application of co-pending U.S. patent application Ser. No. 11/025,548 entitled METHOD AND SYSTEM FOR COMPUTERIZED INSURANCE UNDERWRITING, filed Dec. 28, 2004, which application claims priority to and benefit of U.S. Provisional Patent Application No. 60/533,753 filed Dec. 30, 2003, the entire contents of all of which are herein incorporated by reference for all purposes

BACKGROUND OF THE INVENTION

1. Field of the Invention

This invention relates generally to computer-based insurance processing and more specifically to integrating a legacy insurance policy underwriting process to a real-time on-line process.

2. Description of the Related Art

With regard to the insurance industry, records regarding issued policies, premiums, payments and payouts must be maintained for extended periods of time. The insurance industry readily embraced computer and computer technology for the storage of their records and files and developed special purpose software systems that are suitable for the maintenance and storage of the insurance files.

As computer technology and computer software changes, the insurance industry is pressed to update and upgrade their equipment and facilities. For example, the current computerized process for underwriting an insurance policy is a textual-based system that is burdensome and not user-friendly. The process requires that the underwriting agent prepare forms using manual tabulation of data and, in cases, requires specialized knowledge with regard to translating human-readable information into computer-readable codes. This is time-consuming and labor-intensive. However, there is hesitation to upgrade current existing software, i.e., legacy processor and associated software, as there is a significant cost in time, labor and expense in transitioning existing legacy-software-based files to newer software.

Hence, there is a need for a method and system that is not time-consuming, burdensome and labor-intensive that affords an underwriting agent the ability to process the factors that underwrite an insurance policy while providing proper interface with existing legacy-based files.

SUMMARY OF THE INVENTION

This invention relates generally to computer-based insurance processing and more specifically to integrating the insurance policy underwriting processes. In one aspect of the invention a computer system to perform the process of underwriting, rating, quoting, binding, and booking an insurance policy comprises one or more browsers operative to communicate associated information to a dispatcher that parses the information to select an insurance process and an output device to produce the insurance product. A server having suitable software reviews the message received from a browser and determines whether the message length is greater than a predetermined limit, and if the message is less than the limit, then input data is provided to a first input queue and input to a dispatcher means for subsequent processing. The system further includes the feature whereby if the message is greater than the predetermined limit, then the message is parsed into a header information and one or more data fields information and the header information is provided to first input queue and the data information is provided to a second input queue and the dispatcher means and the data information is provided to a legacy processor and associated software system. In one aspect of the invention, the information in the data field is parsed into multiple records of a predetermined size, preferably 16 kilobytes. Following completion of the processing the results are provided to a user-assigned data queue and subsequently to the server.

BRIEF DESCRIPTION OF THE DRAWINGS

The invention is best understood from the following detailed description when read in connection with the accompanying drawings. The various features of the drawings are not specified exhaustively. On the contrary, the various features may be arbitrarily expanded or reduced for clarity. Included in the drawing are the following figures:

Other aspects, advantages and novel features of the invention will become more apparent from the following detailed description of the invention when considered in conjunction with the accompanying drawings wherein:

FIG. 12 illustrates an exemplary graphic interface in accordance with the principles of the invention.

Figure 1:
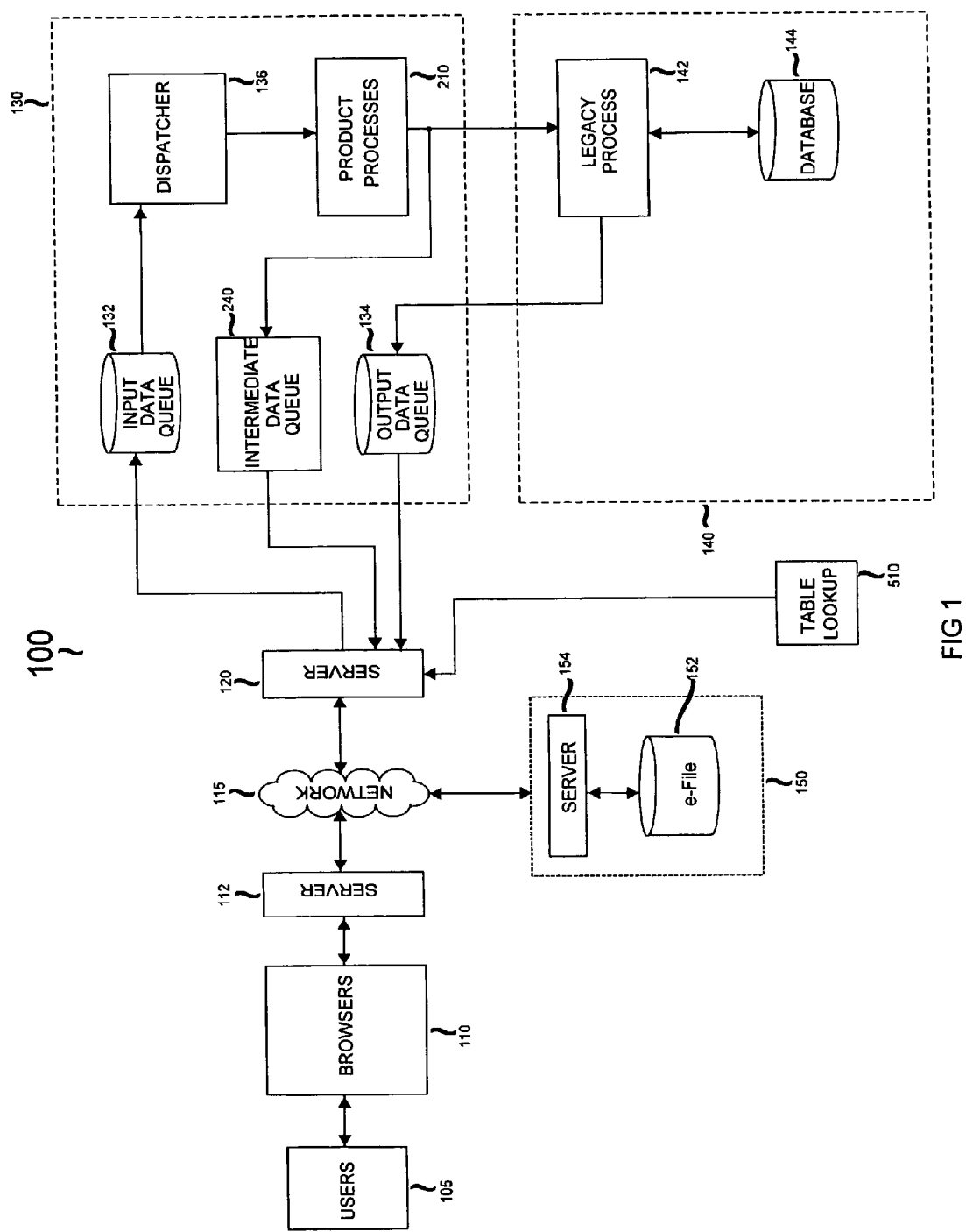
FIG. 1 is a block diagram of a process flow of an underwriting system in accordance with the principles of the invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

In the figures to be discussed, the circuits and associated blocks and arrows represent functions of the process according to the present invention, which may be implemented as electrical circuits and associated wires or data busses, which transport electrical signals. Alternatively, one or more associated arrows may represent communication (e.g., data flow) between software routines, particularly when the present method or apparatus of the present invention is a digital process.

FIG. 1 illustrates a block diagram of a system 100 for an integrated method of insurance underwriting in accordance with the principles of the invention. In this system, one or more users 105 employ a browser apparatus 110 having browser software 113 that operates in association with a web/application server 120 via processor 112 and network 115. Network 115, as would be recognized by those skilled in the art, may be a local area network (LAN), wide area network (WAN), or a public network, such as the INTERNET or conventional telephone network that may include hardware interfaces and input and output devices as by way of example: facsimile machines, document scanners, printers, copiers and handheld communication devices that receive and send information from and to the processes of the present invention and produce insurance policies, insurance statements and bills. Web/app server 120 is also in communication with a system 130 containing data queues 132, intermediary data queues 240 to retain processing results, an output data queue 134 to retain the output from a legacy system, input from a table lookup data base 510 (to be further described in FIG. 5) and a dispatcher module 136 which parses information received from the browser to determine which insurance process to call to service the browser request. Although not shown, it would be appreciated that web/app server 120 may be in communication with system 130 via a network similar to or different from that of network 115.

System 130 is further in communication with system 140 comprised of legacy process and associated software module 142 that is suitable for communicating with a legacy database 144 for the storage and/or retrieval of desired data or information items. One skilled in the art would appreciate that system 140 may be external to system 130 and, thus, system 130 and legacy system software 142 may be in communication via a network similar to or different from that of network 115.

Database system 150, comprised of a database referred to herein as "e-file" database 152 and server 154 is further in communication with network 115. Those skilled in the art of programming will appreciate that the database system 150 may optionally connect directly to the server 112 as described in FIG. 2; the connection being a design choice. The operation of the database 150 is more fully disclosed in FIG. 9 although in general it contains quote letters, binding letters, or issue letters that may be preformed using the available features of the word processing program and desired information associated with each insurance account.

Figure 2:
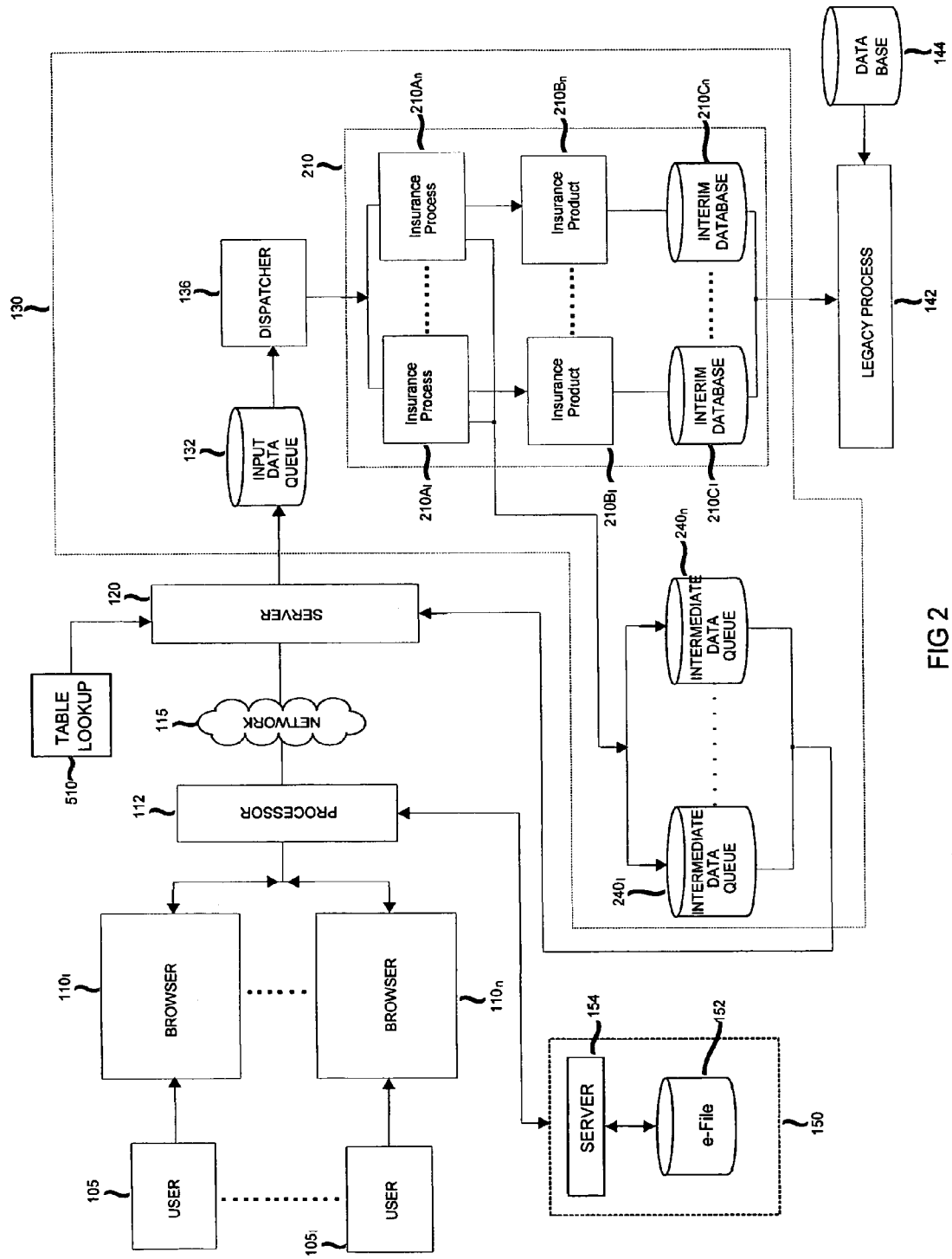
FIG. 2 is a second block diagram of an exemplary process flow of an underwriting system in accordance with the principles of the present invention.

FIG. 2 illustrates a block diagram of the system 130. As noted with regard to FIG. 1, web/app server 120 provides information based upon input received from one or more users $105_1$ through $105_n$ employing one or more browsers $110_1$ through $110_n$ operating in association with processor 112 though the network 115 to an input data queue 132. The information stored in data queue 132 is then provided to the dispatcher 136, which parses the information to determine which specific insurance process $210A_1$ through $210A_n$ is associated with the information. In one embodiment, each process is related to one or more different insurance products $210B_1$ through $210B_n$ that may be available to the public (life, property and casualty) or custom designed products for doctors, lawyers or other professions or organizations requiring a particular kind of insurance.

Processing results $210A_1$ through $210A_n$ are stored in one of a plurality of intermediary data queues $240_1$-$240_n$. Each product $210B_1$ through $210B_n$ stores the results of its processing in an associated data interim database $210C_1$ through $210C_n$ respectively. Intermediary data queues $240_1$ through $240_n$ retain processing results based on a user $105_1$ through user $105_n$ identification. Web/app server 120, in receiving product processing $210A_1$ through $210A_n$ results from the intermediary data queues $240_1$ through $240_n$ transmits the results to the appropriate browser $110_1$ through $110_n$. Although intermediary data queues $240_1$ through $240_n$ are shown to be physically disjointed, it would be recognized by those skilled in the art of computer programming that intermediary data queues $240_1$ through $240_n$ may represent logical devices on one or more physical devices.

In response to a "submit" message from a user at a browser 110, the dispatcher 136 directs the associated process to transfer to the legacy processor and associated software 142, which then stores the results in database 144.

Figure 3:
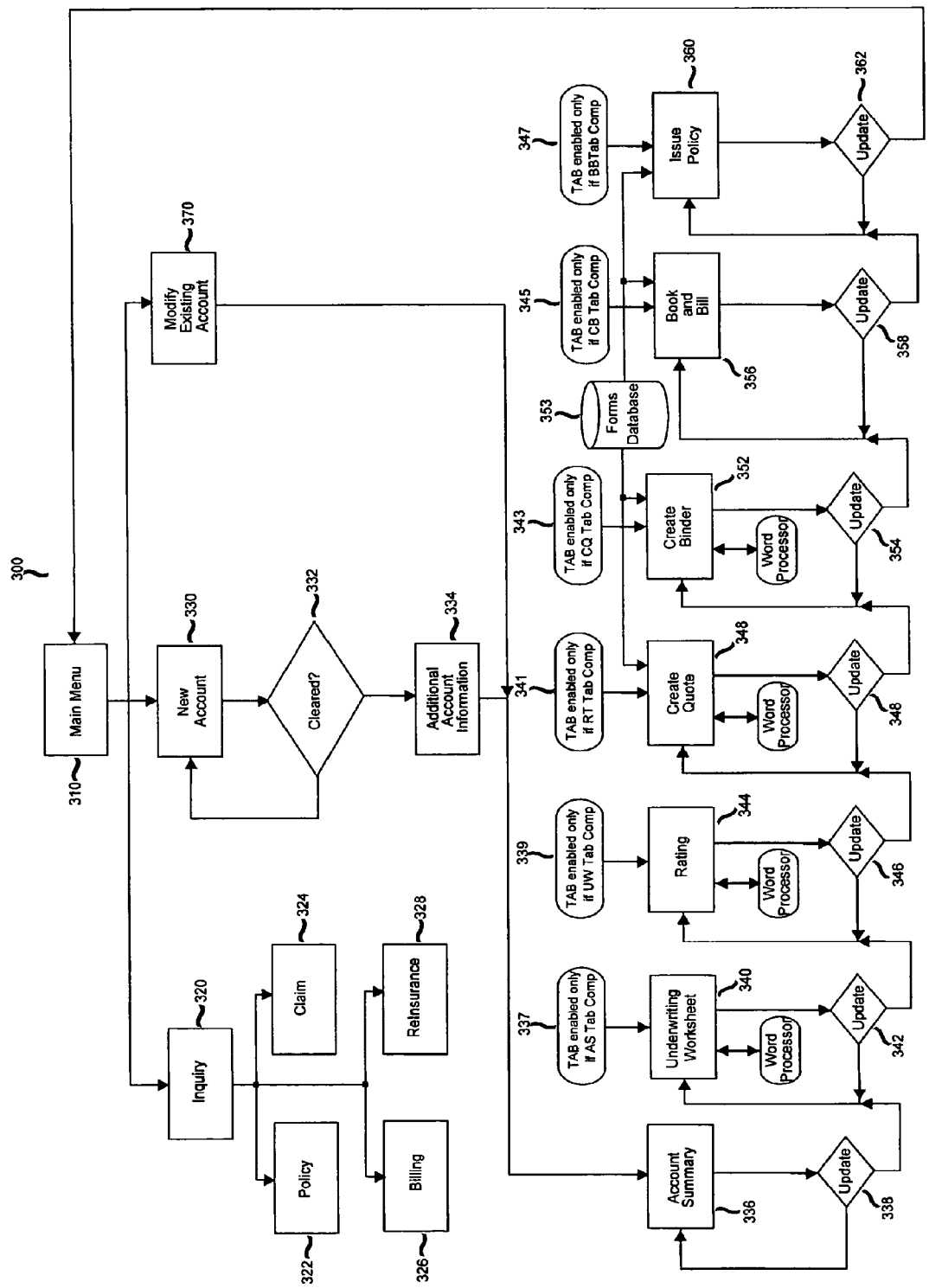
FIG. 3 illustrates a block diagram of the structure of the underwriting system shown in FIG. 1 and FIG. 2.

FIG. 3 illustrates an organizational structure 300 of dispatcher 136 in responding to input data or information items received from the browsers $110_1$ through $110_n$ for each product. In this organization structure, inputs are received by main menu 310, which by way of example then determines whether the input data requires that inquiry processing 320, new account processing 330 or modify existing account processing 370 be performed.

When the main menu 310 determines inquiry processing 320 is to be performed, the content of the inquiry command is then reviewed to determine whether the inquiry requires information as by way of example and not limitation with regard to a policy 322, a claim 324, billing 326 or reinsurance 328. Inquiry processing is more fully disclosed with regard to FIG. 10.

When the main menu block 310 determines new account processing 330 is to be performed, a determination is made at block 332 whether all the account information has been cleared. When all the account information is cleared, the account information is established at block 334. Establishment of account information is more fully disclosed with regard to FIG. 11.

After the account information is established, one of a plurality of processes, i.e., account summary, 336, underwriting worksheet 340, rating 344, create quote 348, create binder 352, book and bill 356, and issue policy 360, associated with the input information item is executed. Account summary processing 336 includes the steps of adding or changing general detail information such as new or renewal, primary or excess, effective date, contact information and product selection. Underwriting worksheet 340 includes the steps of adding additional information based on the product selected. The information is product specific. Rating process 344 includes the steps of defining debits or credits and calculating premium options using either a legacy rating engine or a spreadsheet means. Create quote process 348 includes the steps of creating a letter, conventionally referred to as a quote letter, using a word processing program with an option to select various premiums calculated from rating process 344. The create binder process 352 includes the steps of creating a letter, conventionally referred to as a binder letter, using a word processing program with an option to select a premium option calculated from rating process 344. Book and bill process 356 includes the steps of selecting industry code, ISO class as well as payment plan and billing method before finalizing or booking the account. Issue policy process 360 includes the steps of printing and issuing an insurance policy. Optionally, a printer and output type, such as draft or production, may be selected.

In one aspect of the invention, each of the processes is executed in sequence, wherein a subsequent process is not allowed to be performed until a preceding process has completed it operation. Thus, after the account summary process 336 is executed, a determination is made at block 338 whether an update of the account summary has occurred. If the answer is negative, then processing is returned to the account summary process for further processing. However, if the answer is in the affirmative, then tab 337 enables processing to continue to underwriting worksheet 340 processing. Similarly, rating 344 processing is executed until a determination at block 346 indicates that the preceding process, in this case rating 344, has been executed or performed. FIG. 3 illustrates that each of the processes 336, 340, 344, 348, 352, 356 and 360 have corresponding tests 338, 342, 346, 348, 354, 358 and 362. In each instance a corresponding tab 337, 339, 341, 343, 345 and 347 enable the subsequent process to operate if the determination is in the affirmative.

The ability to determine the execution of preceding processes is advantageous as it allows the user to update, amend or modify input data or prior process results without requiring the sequential execution of preceding processes. In this manner, an underwriting process may be partitioned into one or more sessions that enables the user to "tailor", customize or modify a desired package to meet the insured party's needs.

Modify existing account process 370 operates on existing accounts and operates similar to new account process 330 in executing one or more of the illustrated processes. However, as the nomenclature suggests, modification, amendment and changes to existing policies are achieved.

Also illustrated is a forms data base 353, which includes a plurality of standardized forms used in the insurance underwriting process. The use of standardized forms is advantageous as it provides the user known, pre-approved forms and letters. Furthermore, the contents of the forms can be dynamically filled by information provided by each of the processes included in the underwriting process. Forms database 353 is accessible from create quote process 348, create binder process 352, book and bill process 356 and issue policy process 360. These processes may further enable the forms to be contained in a centralized process for storage and archiving.

Figure 4:
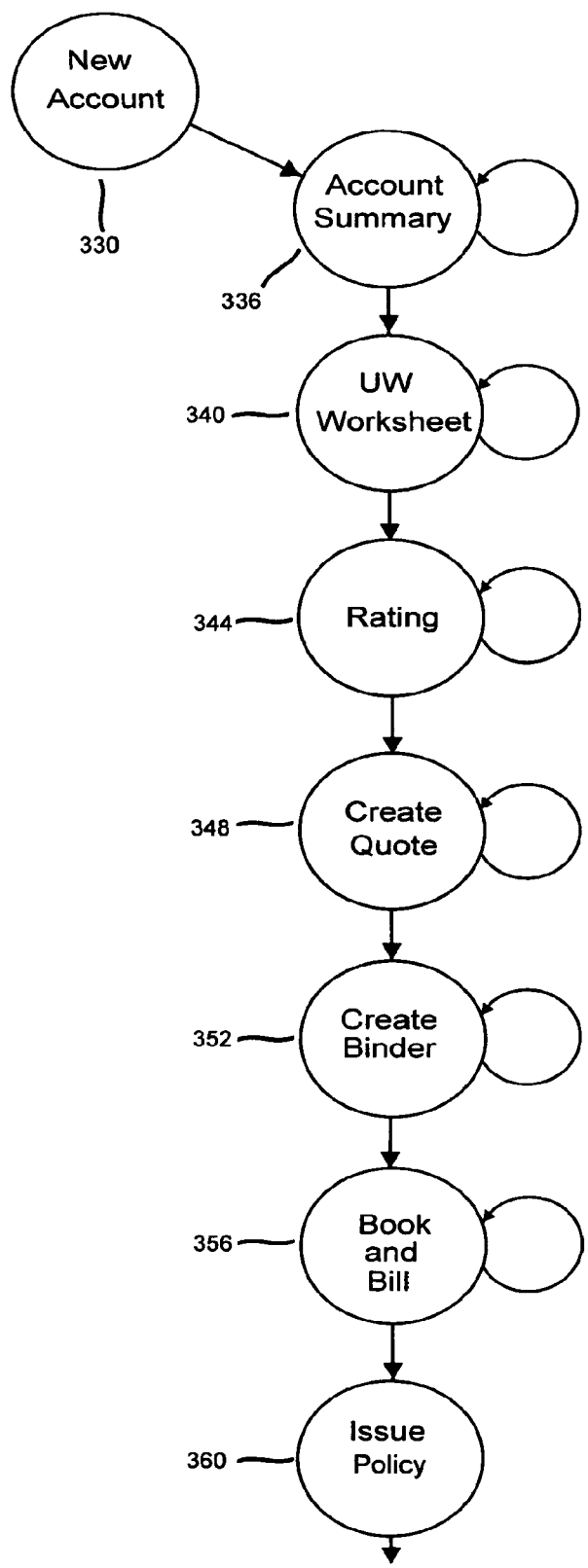
FIG. 4 illustrates a state diagram of the exemplary structure shown in FIG. 3.

In one aspect of the invention FIG. 4 illustrates an exemplary state diagram of the process shown in FIG. 3. In this exemplary process diagram, each of the processes 336 through 360 is represented as a state that when successfully completed allows processing to continue at a next state. For example, when rating state 344 is completed, processing continues at process create quote 348. Otherwise, processing remains in the rating state 344. In one aspect of the invention, a state variable or variables may include indications about which states have been executed. Hence, a process state may not be executed until the preceding states have been indicated to have been executed. In another aspect, when a state is entered, all indication of subsequent state processes are set to a "not executed" state.

Figure 5:
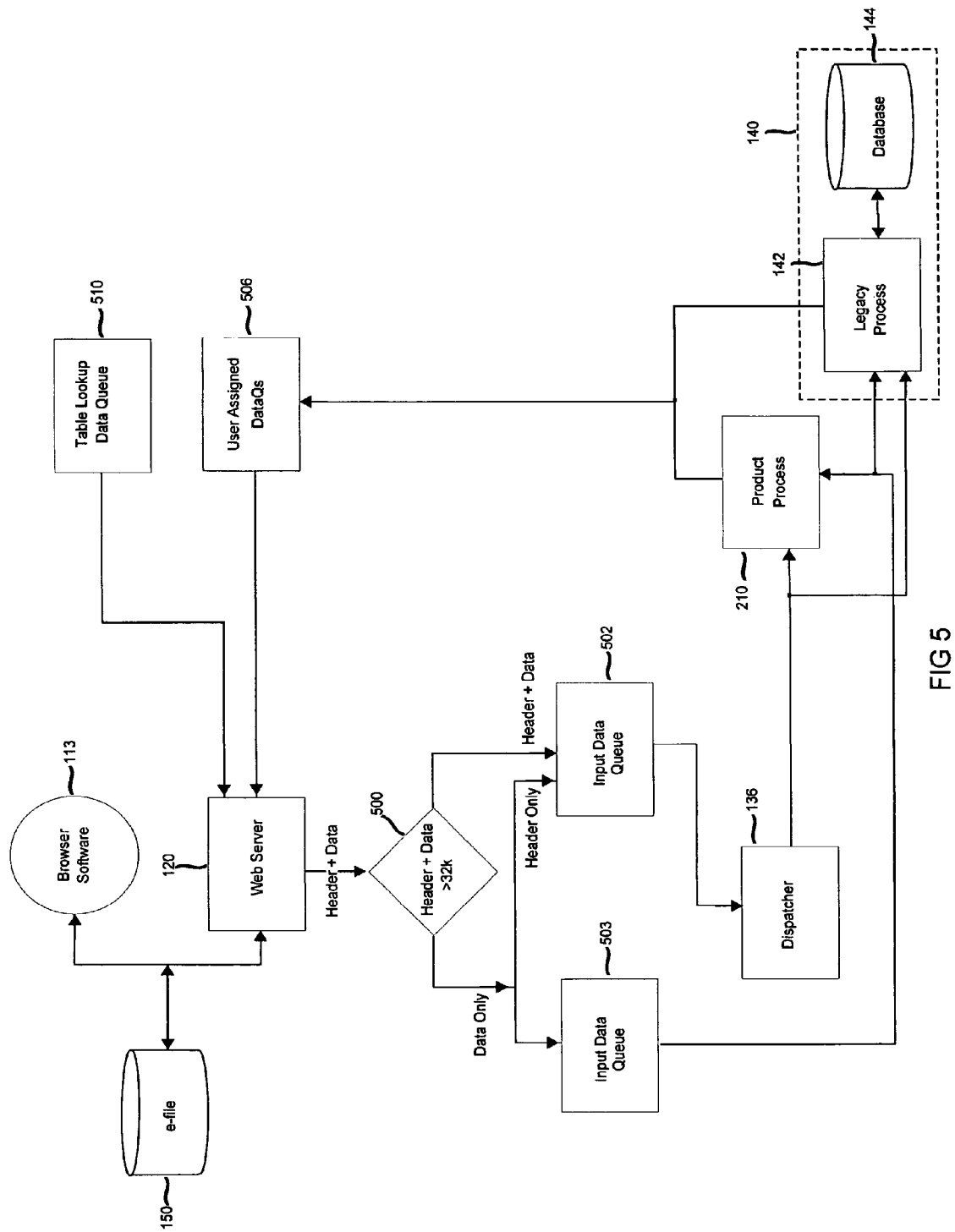
FIG. 5 illustrates a block diagram of a second aspect of the system shown in FIG. 1 and FIG. 2.

FIG. 5 illustrates a block diagram of another aspect of the system shown in FIG. 1 and FIG. 2. In this aspect of the invention, browser 110 software 113 controls a communication with the e-file system 150 and processor 112 directly or via network 115 (not shown). Web server 120 reviews the message received from browser software 113 and determines at decision block 500 whether the message length is greater than a predetermined length. In one aspect of the invention, the predetermined limit is set to 32 kilobytes. If the determination is that the message length is not greater than a predetermined limit, then the input data is provided to an input queue 502. The information may then be provided to the dispatcher 136 for subsequent process as described in FIG. 1 and FIG. 2.

However, if the message is greater than the predetermined limit, then the information is parsed into a header and data fields. In this case, the header information is provided to first input queue 502 and the data information is provided to an input queue 503. In this case, the header is provided to the dispatcher 136 and the data information is provided to one of the products process 210 or the legacy system 140 having the legacy process 142 and an associated database 144. In one aspect the information in the data field is parsed into multiple records of a predetermined size. In one embodiment, the record size is 16 kilobytes. Upon process completion the results are provided to the user assigned data queue 506 and subsequently to the web server 120.

A table lookup data base 510 may include information that may be used in a browser 110$_n$ through 110$_n$ "drop-down" menus associated with a specific field in a specific process interface. For example, the address field table lookup data base 510 may include the names of the fifty states of the United States which may be displayed in a "drop-down" menu. A user may then select one of the predefined entries from the "drop-down" menu. Table lookup data base 510 may also include, for example, product codes or underwriter codes by way of example.

Figure 6:
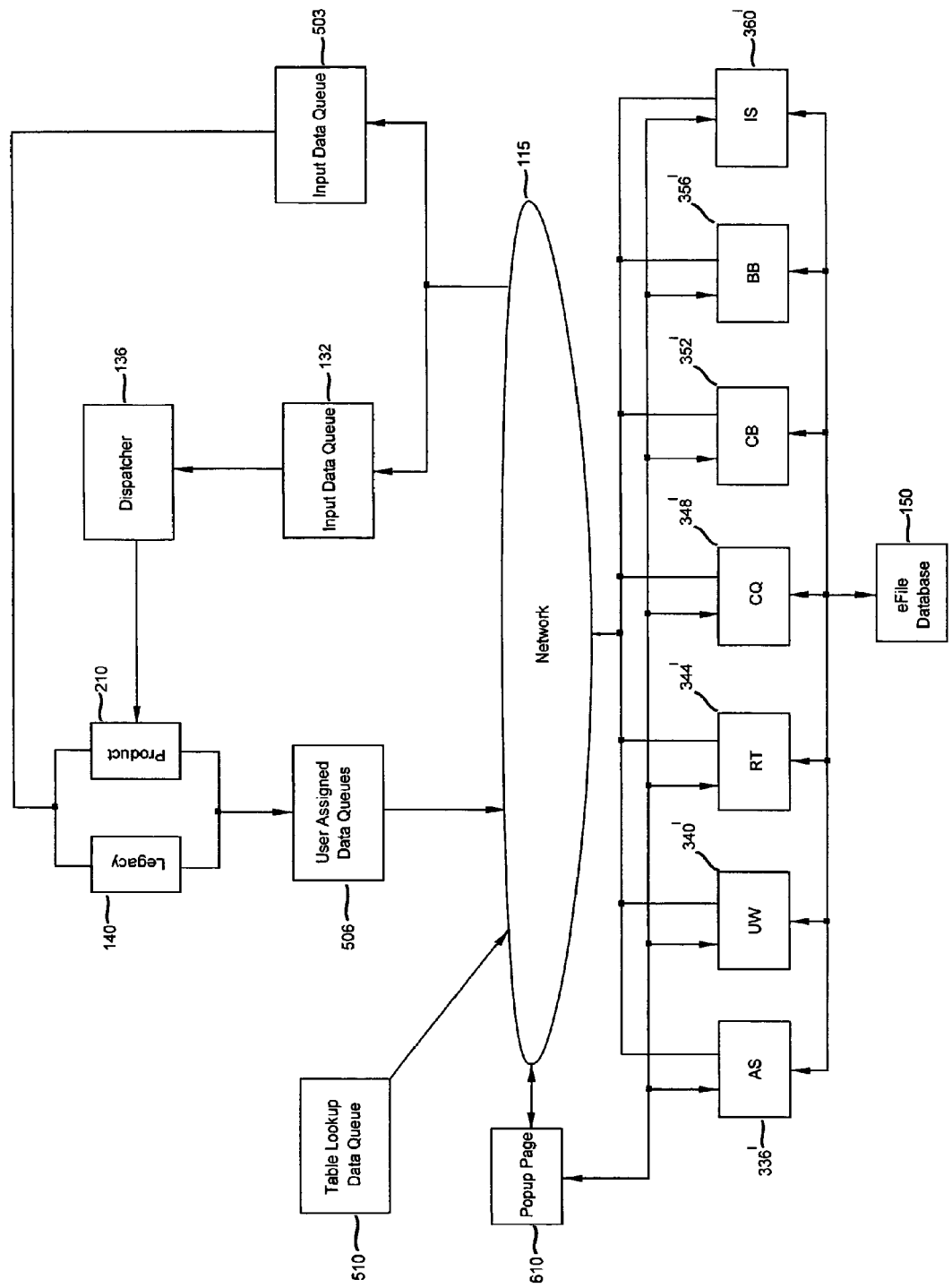
FIG. 6 illustrates a block diagram of another aspect of the system shown in FIG. 1 and FIG. 2.

FIG. 6 illustrates a block diagram of another aspect of the system shown in FIG. 1 and FIG. 2. In this aspect of the system, browser software 113 is shown comprising processes account summary 336', underwriting worksheet 340', rating 344' create quote 348', create binder 352', book and bill 356', and issue 360', which correspond to dispatcher 136 processes 336 through 360, respectively. Each process 336'-360' is operable to assess e-file data base 150 and Popup page 610. Popup page 610 is operable to display information associated with table lookup data base 510. In this aspect of the invention, the centralized table lookup data base 510 allows additions to the information in the table lookup data without altering any browser 110$_1$ through 110$_n$.

The network 115 transmits and receives data from the browser processes 336' through 360' to the input data queues 132 and the input data queue 503 which operation in conjunction with dispatcher 136 previously has been described. The information stored in data queue 132 is then provided to the dispatcher 136, which parses the information to determine which specific process 210 such as shown in FIG. 1 processes 210A$_1$ through 210A$_n$ is associated with the information. Input data queue 503 also communicates with the legacy process 140 to update information in the data base 144.

Figure 7:
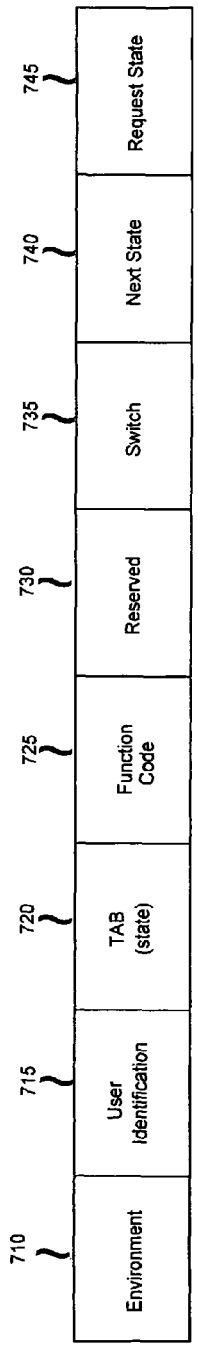
FIG. 7 illustrates an exemplary format for exchanging information in accordance with the principles of the invention.

FIG. 7 illustrates an exemplary format 700 for exchanging information in accordance with the principles of the present invention. In this exemplary format, thirty (30) data bytes are allocated for data transfer. In one aspect, data bytes are composed of 8 data bits. However, it would be recognized that the number of data bytes or the size of the data bytes may be altered without altering the scope of the invention and is thus considered to be within the scope of the invention.

In this case, eight (8) bytes 710 are allocated for the identification of a desired process or operation, seven (7) bytes 715 are allocated as a user identification, that may also be used as an identifier on the respective data queues. Five (5) bytes 720 are allocated for a state identification, seven (7) bytes 725 are allocated for a state function identification, nine (9) bytes 730 are held as reserved, ten (10) bytes 735 are allocated for a state switch indication, five (5) bytes 740 are allocated to provide an indication to allow a next state, and two (2) bytes 745 are allocated to indicate the status of a request.

Process identification bytes 710 may be associated with the type of environment dispatcher 136 is operating within. For example, dispatcher 136 may operate in a production environment, a test environment or a shut down environment. As one skilled in the art would recognize, in a test environment dispatcher 136 would include executable features that may not be included in a production environment.

User identification bytes 715 may be statically or dynamically assigned to a user to uniquely identify users. In one aspect, the user identification 715 may be $105_1$ through $105_n$ the user name or initials. The User identification may also include a password that limits access to authorized users. State identifier 720 provides an identification of a current state. With reference to FIG. 3, the state identifier 720 may be associated with and identified as account summary, underwriting worksheet, rate, create quote, create binder and issue. Function identifier code 725 provides an identification regarding a next operation to be executed. In one aspect, function identifier code 725 may represent a state such as "update and remain at current state" or "update and advance to next state." In the former case, data bases may be updated, but the processing remains at a current state, while in the latter case, data bases may be updated and processing is allowed to proceed to the next state. State switch indication 735 provides direction with regard to a switch in the state process flow of dispatcher 136. Switch indication 735 may be used by browser 110 to enable a user to enter information suitable for a next state. Next state indicator 740 may be used by any browser $110_1$ through $110_n$ to enable a user to progress or proceed to a next state. Request state 745 may be used by any browser $110_1$ through $110_n$ to indicate when a requested update has been completed successfully.

Figure 8:
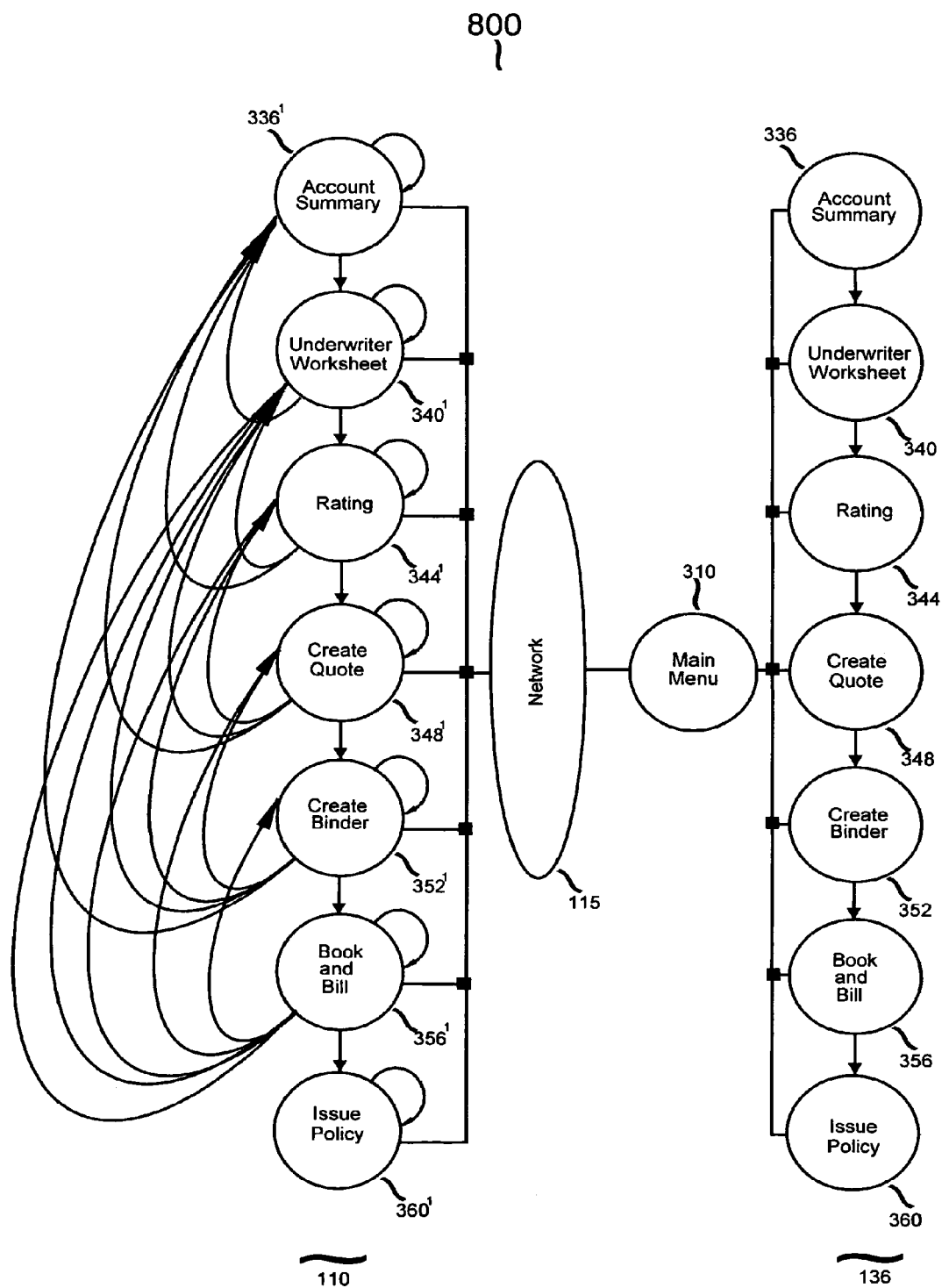
FIG. 8 illustrates a state diagram of an exemplary processing in accordance with the principles of the invention.

A method of the present invention underwrites, rates, quotes, binds, books and bills and issues insurance policies comprising the steps of maintaining the browser 110 to communicate information to the dispatcher system 130, and parsing information in the dispatcher 136 to communicate with one or more insurance generating processes 210. FIG. 8 illustrates a state diagram depicting an exemplary interaction 800 between the browser $110_1$ through $110_n$ and the dispatcher 136 over the network 115 in accordance with the principles of the invention. In this illustration, dispatcher states 336 through 360 are in communication with a main menu state 310, as discussed with regard to FIG. 3 and FIG. 4. Browsers $110_1$ through $110_n$ include states 336' through 360' corresponding to states 336 through 360 in the dispatcher 136. Process states 336' through 360' allow a user to enter information items, using a Graphic User Interface (GUI) that may be processed by dispatcher 136. In this illustrated embodiment, process states 336' through 356' are operable to remain in a current state, proceed to a subsequent state or to a preceding state. In the illustrated embodiment, a user thus may restart all or part of the underwriting process to customize the package to meet an insured party's needs.

Using a GUI corresponding to a specific state, a user may manually enter the state, for example 336', which is then registered as a current state. The current state may then be transferred to the dispatcher 136 through the transfer format 700 shown in FIG. 7 and the corresponding process may then be executed. Upon completion of the current state processing, an indication of successful update is returned to the associated browser $110_1$ through $110_n$ which allows a user to enter next subsequent state, in this case state 340', and enter information items using a GUI associated with this new current state. The information items obtained in this new current state 340' may then be transferred to the dispatcher 136 through transfer format 700 shown in FIG. 7 and the corresponding process may then be executed. Upon completion of the current state processing, an indication of successful completion or update is returned to the associated browser $110_1$ through $110_n$ which allows a user to enter next subsequent state. This procedure may be repeated until each of the process states has been successfully completed.

However, the user may manually return to a preceding state to update the information contained therein and execute the associated processing in the dispatcher 136. This ability to repeat certain preceding processes is advantageous as it allows for alternative formulations of the underwriting process without requiring input of all prior data.

Communication with legacy processor and associated software 142 may be performed using known software tools. For example, in one aspect, use of IBM AS/400 software Toolkit provides necessary plug-ins and protocols to communicate with legacy database 144 and need not be discussed in detail herein. IBM is a registered Trademark of the International Business Machine Corporation, Armonk, N.Y.

Figure 9:
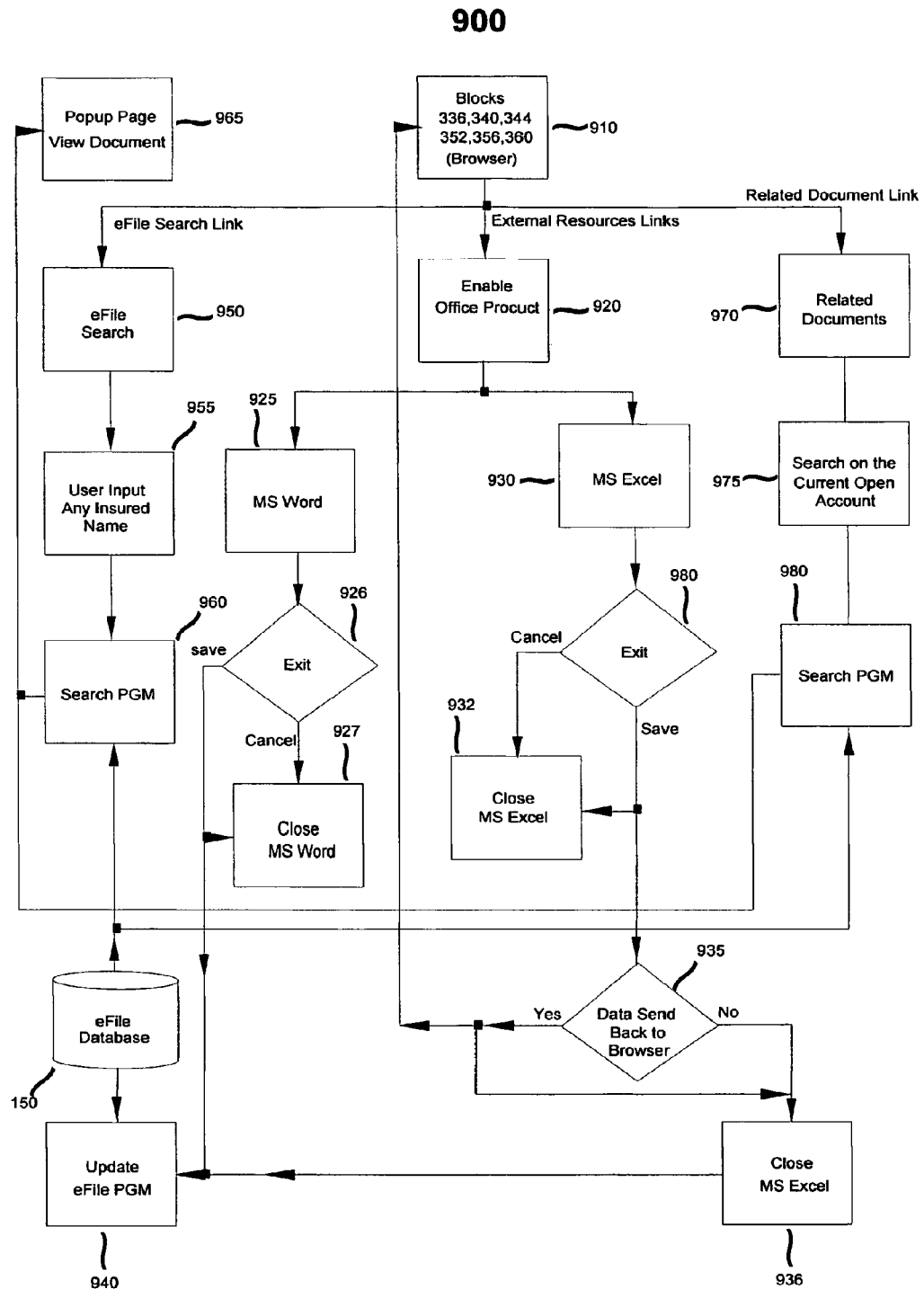
FIG. 9 illustrates a flow chart of an exemplary process associated with the operation and communication with e-file database in accordance with the principles of the invention.

FIG. 9 illustrates a flow chart 900 of an exemplary processing associated with the operation and communication with e-file database 150. As illustrated, this exemplary process may be accessed by process steps 336, 340, 344, 352, 356 and 360 shown in FIG. 3, represented by block 910. At block 920 access to an available suite of programs for word processor or spreadsheet operation is enabled. In one aspect, access to word processing software MS-WORD 925 and spreadsheet software MS-EXCEL 930 is available. MS-WORD and MS-EXCEL are registered trademarks of the Microsoft Corporation, Redmond, Wash. Although the present invention is disclosed with regard to MS-WORD and MS-EXCEL, it would be recognized by those skilled in the art that other word processing or spreadsheet programs may also be used and, thus, are considered to be within the scope of the invention.

Templates, created or available, within the word processing program may then be accessed and information items from an associated account may then be stored in predetermined fields within a selected template. For example, quote letters, binding letters, or issue letters may be preformed using the available features of the word processing program and desired information associated with each account may be extracted from the collected data and stored in predetermined fields within the selected template.

At block 926 a determination is made whether to exit the selected word processing program. When exiting the program, the program is closed at block 927 and processing proceeds to block 940 to update an e-file 150 program. The updated information is then stored in the e-file data base 150 (FIG. 1).

Similarly, when the spreadsheet program, in this case MS-EXCEL, is selected at block 930, templates available at block 930 are accessed and information from an associated account is stored in predetermined fields within a selected template. At block 931, a determination is made whether to exit the selected program and the program closed at block 932. A determination is then made at block 935 whether the information is to be returned to a browser $110_1$ through $110_n$ (FIG. 1). If the answer is in the affirmative, the program is closed at block 936 and the information is returned via block 910.

However, if the answer is in the negative, then the program is closed at block 936 and processing proceeds to block 940 to update the e-file 150 program. The updated information is stored in e-file data base 150 (FIG. 1).

In another aspect, the e-file data base 152 may be searched, at block 950, for designated or selected account information. In this case, information regarding account information, such as insured name, is made available at block 955. At block 960, the e-file database 152 is accessed and searched for the designated or selected account. At block 965, the information is returned to the search requester, i.e., the associated browser 110₁ through 110ₙ.

In another aspect, documents related to a particular account, e.g., the currently opened account associated with the specific user, may be accessed at block 970. In this case, a search for documents associated with a currently opened account is initiated at block 975. At block 980 a search program is executed that accesses e-file database 152. The results of the search may then be provided to search requester at block 965.

Figure 10:
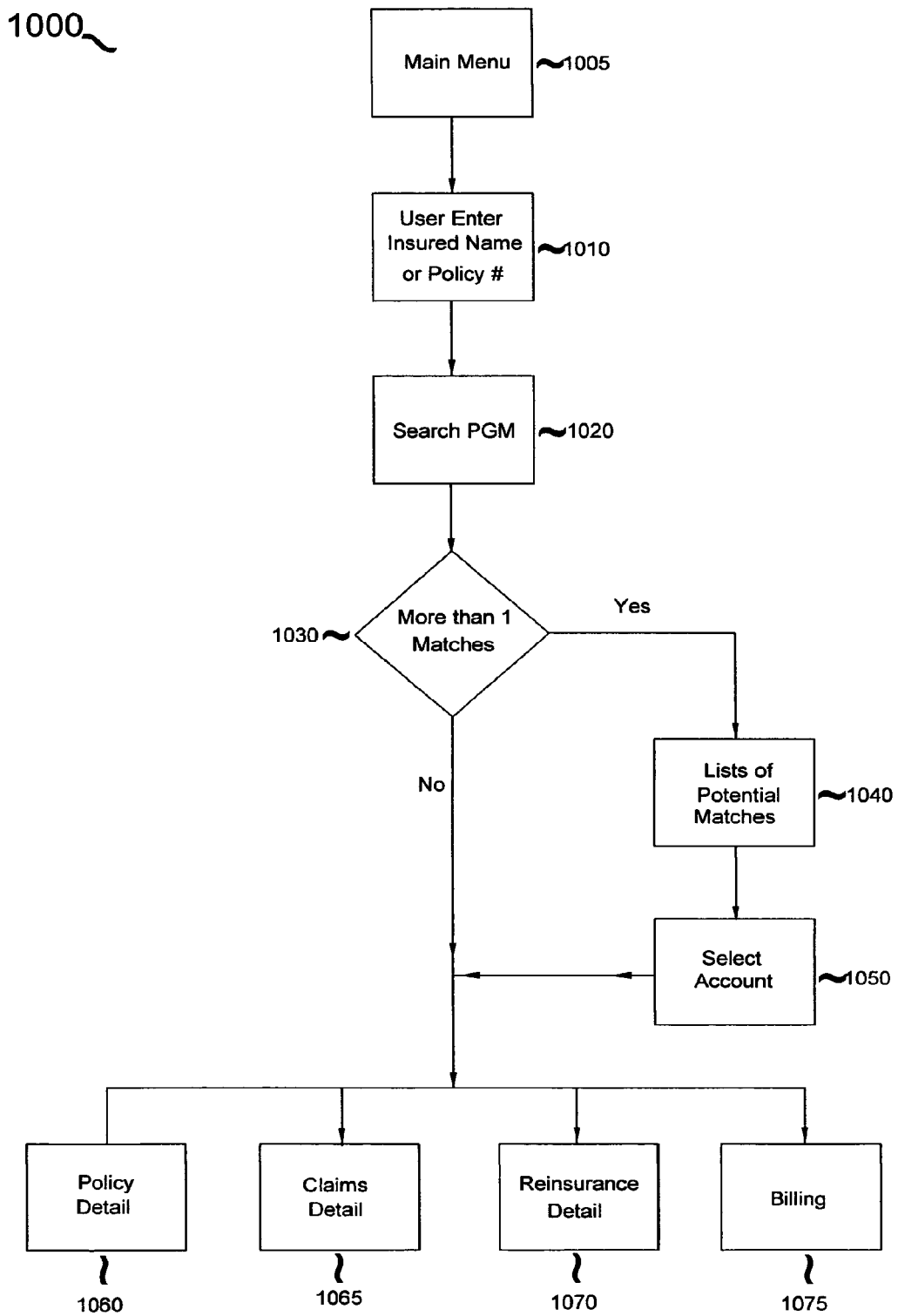
FIG. 10 illustrates an exemplary process associated with parsing of an Inquiry command in accordance with the principles of the invention.

FIG. 10 illustrates an exemplary process 1000 associated with parsing of an inquiry command chosen from a main menu 1005 in accordance with the principles of the invention. In this illustrated process, information associated with a desired account, e.g., user name or policy number, is provided at block 1010. At block 1020, a search program is executed to extract account information associated with the provided input data. At block 1030, a determination is made whether more than one entry has matched the provided input information. If the answer is in the affirmative then the matching entries are provided to a user at block 1040. At block 1050, a user may select an account from the matching entries. The selected account is then provided to the policy detail module 1060, the claims detail module 1065, reinsurance detail module 1070 or billing module 1075. Policy detail module 1060 may include information regarding the policy limits or terms associated with the selected account. Claims detail module 1065 may include information regarding claims written or processed against the selected account. Reinsurance module 1070 may include information regarding whether reinsurance is associated with the selected account. Billing module 1075 may include information regarding invoices and payments associated with the selected account.

However, if only one entry is found to match the provided input information, then that entry is provided to the policy detail module 1060, the claims detail module 1065, reinsurance detail module 1070 or billing module 1075.

Figure 11:
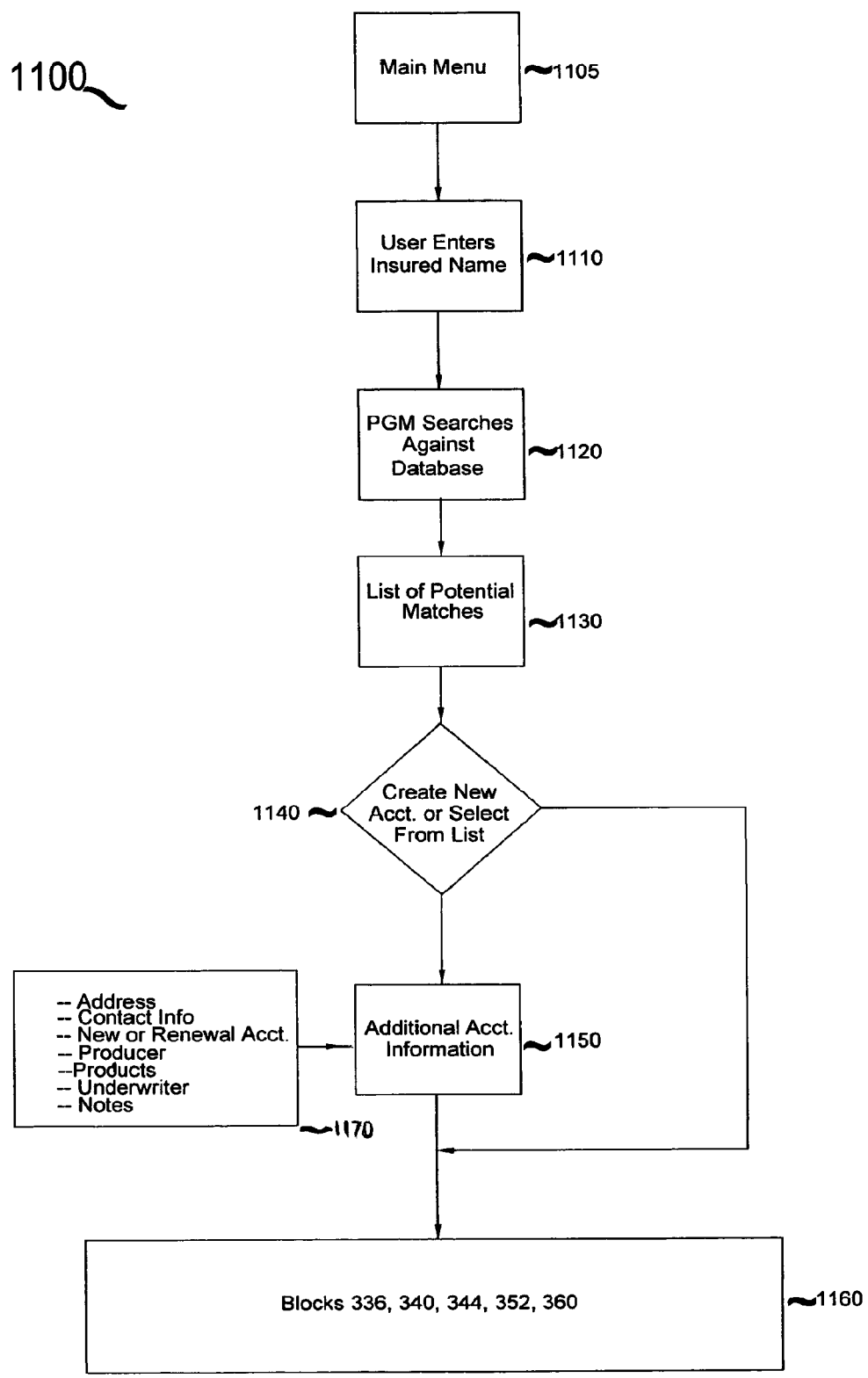
FIG. 11 illustrates an exemplary process for establishing account information in accordance with the principles of the invention.

FIG. 11 illustrates an exemplary process 1100 for establishing account information. In the illustrated process, a user 105 such as earlier described in connection with FIG. 1 is presented with a main menu 1105 and enters information, such as a name of an insured party or other identifying characteristic, at block 1110. For example, a user may enter one or more characters that represent parts or all of a name or identifying characteristic. At block 1120 a search of the legacy data base 144 (FIG. 1) is executed to determine entries, i.e., user accounts, that substantially match the user entered information. At block 1130 a list of matching entries that substantially match the user entered information is provided to the user. At block 1140, a determination is made whether the user entered information matches an entry on the list of matching entries or whether a new account must be created. If a matching entry is found, then the information in the entry or account is made available to one or more of the processes shown in FIG. 3, as represented by block 1160.

However, if a matching entry is not found, a new account may be created at block 1150, wherein additional information such as address, contact information, new account or account renewal, producer, product, or underwriter may be entered. In addition, notes or comments may be added to the account information. The information in the new entry or account is then made available to one or more of the processes shown in FIG. 3, as represented by block 1160.

Figure 12:
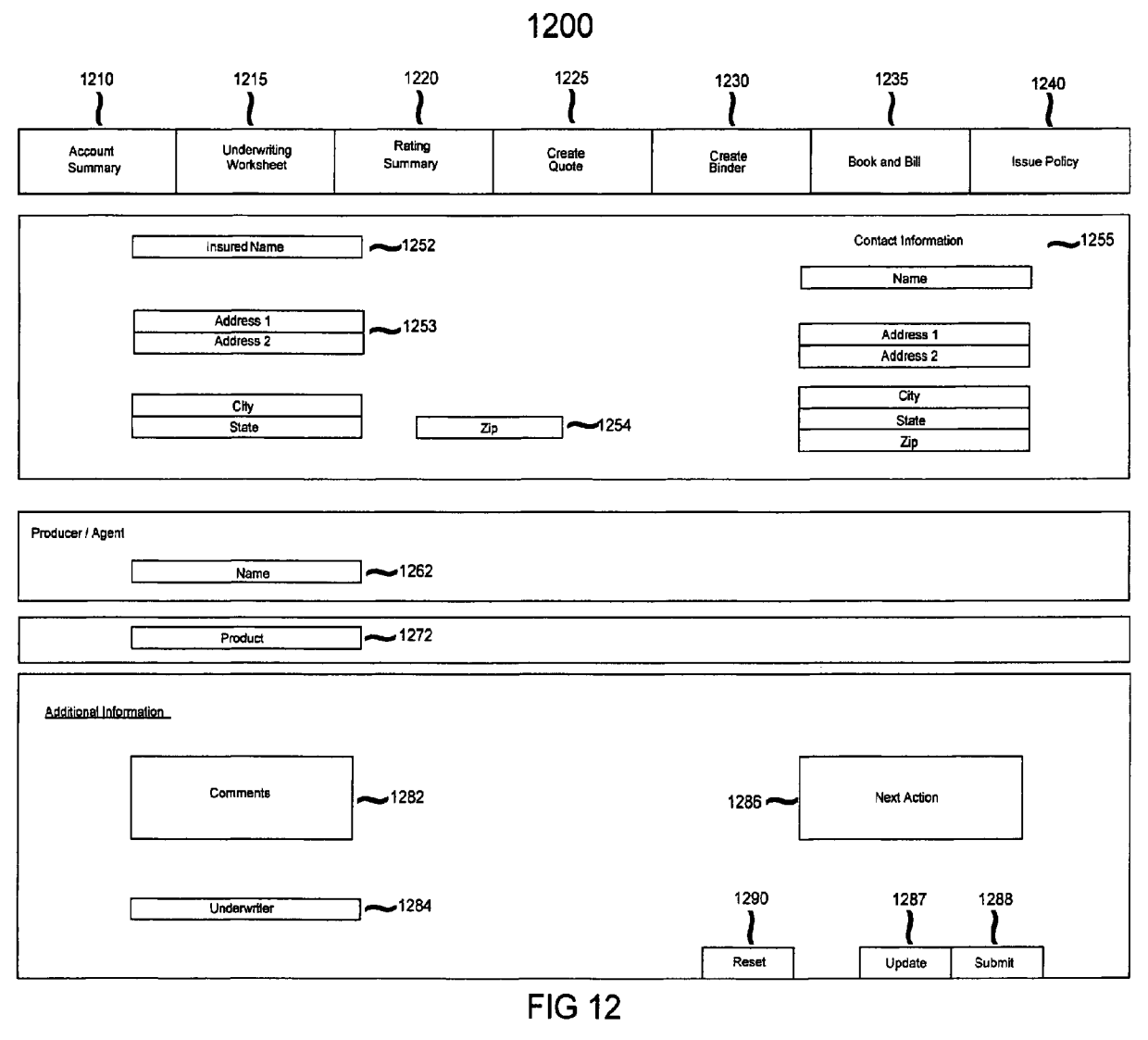

FIG. 12 illustrates an exemplary GUI 1200 for processing account information in accordance with the principles of the invention. In this illustrated interface, a user may select a process such as account summary 1210, underwriting worksheet 1215, rating summary 1220, create quote 1225, create binder 1230, book and bill 1235 or issue policy 1240. As previously described, processes are selected in a sequential order but previously executed processes may be re-selected to update information within the selected process.

FIG. 12 depicts the GUI associated with account summary process 1210, i.e. process 336. In this interface, information regarding the insured party, such as name, address and city/state may be entered at blocks 1252, 1253, 1254 respectively. Also information contact or beneficiary information may be provided at block 1255.

At block 1262, information regarding a producer or agent may be entered and at block 1272 information regarding the type of insurance, e.g., D&O, malpractice, etc., may be entered. At blocks 1282, comments regarding the policy or the account may be entered and at block 1284 the underwriter may be identified. At block 1286 a date of a next action and type of action may be entered or determined. For example, the date of the next premium payment may be determined based on the payment terms.

At block 1287, an "update" operation allows the user to update the information entered and at block 1288, a "submit" operation allows the user to memorialize the entered information. The "submit" procedure further indicates that a step has been completed, thus enabling entry into a next process. A "reset" operation, at block 1290, clears the information on the currently displayed GUI.

Furthermore, each of the processes is accessible on each of the available process GUIs by maintaining indications 1210 through 1240 associated with the processes 336 through 360, respectively. In this manner, a user may switch between process indications to review or change data in other processes.

In an embodiment, a computer system for underwriting, rating, quoting, binding, and booking an insurance policy includes one or more browsers operative to communicate associated information to a dispatcher that parses the information to select an insurance process and an output device to produce an insurance product. The dispatcher may communicate with a legacy system and produce data to an output data queue to retain the output received from a legacy system. One or more browsers may communicate information to the dispatcher, which parses the information to determine the specific insurance process associated with the information. One or more data queues may communicate one or more results of a specific process to the browser. Dispatcher inputs may be received from a main menu, which determines whether the input data requires processing selected from a group including: an inquiry processing, a new account processing or a modify existing account processing. One or more browsers may communicate with an e-file. A server analyzes a message from one or more browsers and determines whether the message length is greater than a predetermined length.

In an embodiment, the computer system may further include a server to review a message received from the browser and a means to determine whether the message length is greater than a predetermined limit; and if the message is less than the limit then input data is provided to a first input queue and used as input to a means for producing the insurance product. In an embodiment, if the message is greater than the predetermined limit, then the message is parsed into a header information and one or more data fields information and the header information is provided to first input queue and the data fields information is provided to a second input queue and the dispatcher means and the data fields information is provided to a legacy processor and associated software system. The information in the data field may be parsed into multiple records of a predetermined size. The message size may be equal to or greater than 16 kilobytes. The subsequent processing completion results may be provided to a user assigned data queue and subsequently to the server.

In an embodiment, the computer system includes a table lookup data queue for underwriting, rating, quoting, binding, booking and billing and issuing insurance policies including : a drop-down menu in a browser associated with a field selected from a group including: the identification of a desired process or operation, data bytes for user identification, data bytes for a state identification, data bytes for state function identification, data bytes for a state switch indication, data bytes for providing an indication to allow a next state, data bytes for indicating the status of a request.

In an embodiment, a computer readable medium for underwriting, rating, quoting, binding, booking and billing and issuing insurance policies has stored thereon one or more data structure to transfer control selected from a group comprising: a plurality of data for the identification of a desired process or operation, data for user identification, data for a state identification, data for state function identification, data for a state switch indication, data for providing an indication to allow a next state, data for indicating the status of a request.

In an embodiment, a computer-based insurance processing system includes a browser having executable browser software to process account summaries, underwriting worksheets, ratings, quotes, binders, and bills and issue insurance policies, which correspond to associated dispatcher means for producing an insurance product and an output device to print insurance products. In the computer-based insurance processing system, each process may be operable to access one or more e-file databases and to display one or more pop up pages on the browser. The one or more pop up pages may be operable to display information on the browser associated with a table lookup data queue for underwriting, rating, quoting, binding, booking and billing and issuing insurance policies. The table lookup data queue may allow additions to the information in the table lookup data without altering the browser.

The computer-based insurance processing system may further include one or more state switches and associated state indicators to provide process direction to a state flow process of a dispatcher in association with a browser and a means for producing an insurance product and an output device to print the insurance product. The switch indication may be used by the browser to enable a user to enter information through the browser suitable for a next state, wherein the next state produces an associated indication. The next state indicator may be used by the browser to enable a user through the browser to proceed to a subsequent state. The browser may use a request state to indicate when a requested update has been completed. The computer-based insurance processing system may further include: a main menu state. The browser state may correspond to the dispatcher state. The browser state may allow a user to enter information using a Graphic User Interface (GUI) to be processed by the dispatcher. The browser state may be operable to remain in a current state, to proceed to a subsequent state or to a preceding state. The GUI corresponding to a specific state may allow a user to manually enter the state, which is then registered as a current state. The current state may be then transferred to the dispatcher through a transfer control format initiating execution of a corresponding process. Upon a completion of the current state processing, an indication of a successful update may be returned to the associated browser, which allows a user to enter subsequent state. In an embodiment, a user may enter information using a GUI associated with this new current state.

In an embodiment, a computer method to underwrite, rate, quote, bind, book and bill and issue insurance policies includes the steps of maintaining a browser to communicate information to a dispatcher, and parsing information in the dispatcher to communicate with one or more insurance generating processes and printing one or more insurance products resulting from the processes. The method may include the additional step wherein the dispatcher communicates with a legacy system and produces output to a data queue. The method may include the additional step of maintaining one or more browsers to communicate information to a dispatcher, which parses the information to determine the specific insurance process associated with the information. The method may include the additional step of transmitting from one or more data queues the results of a specific process associated with the information to the appropriate browser. The method may include the additional step of inputting information by the dispatcher and receiving said input by a main menu which determines whether the input data requires processing from a group including: an inquiry processing, a new account processing or a modify existing account processing. The method may include the additional step of maintaining one or more browsers to communicate with an e-file system.

The method may include the additional step of reviewing the message received from one or more browsers to determine whether the message length is greater than a predetermined length. The method may include the additional step of: reviewing a message received from the browser and determining whether the message length is greater than a predetermined limit, and if the message is less than the limit then inputting data to the dispatcher for subsequent selection of an insurance process and printing an insurance product based upon the insurance process. The method may include the additional step wherein if the message is greater than the predetermined limit, then the message is parsed into a header information and one or more data fields information and the header information is provided to first input queue and the data information is provided to a second input queue and the dispatcher means and the data information is provided to a legacy processor and associated software system. The method may include the additional step wherein the information in the data field is parsed into multiple records of a predetermined size. The method may include the additional step of maintaining the message size to 16 kilobytes.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated. It will be understood that various omissions and substitutions and changes in the routines and algorithms described, in the form and details of the methodologies disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also contemplated and should be considered embodied in the present invention.

What is claimed is:

1. A computer system for processing data related to insurance, comprising:
an intermediary computer system in communication with an insurance computer system and a network, the intermediary computer system comprising a processor and a memory device, and configured to generate instructions to the insurance computer system to perform one of a plurality of insurance processes wherein the insurance processes comprise a rating process and a create quote process;
the intermediary computer system being further configured to: communicate via the network with a plurality of user devices having browsers maintained in a plurality of user-selected browser states, each of the browser states configured to generate an associated interface element corresponding to one of the insurance processes; maintain a plurality of process states corresponding to the browser states; receive data from the browsers; and permit the user-selected browser state only subject to permission for the corresponding insurance process to be performed.

2. The computer system of claim 1, wherein the insurance processes have a sequence, the intermediary computer system is further configured to permit execution of one of the insurance processes only upon completion of a prior one of the plurality of insurance processes in the sequence, the rating process being prior to the create quote process.

3. The computer system of claim 2, wherein the insurance processes further comprise an underwriting worksheet process prior to the rating process and a create binder process subsequent to the create quote process.

4. The computer system of claim 1, wherein the intermediary computer system is further configured to, responsive to receipt of input data from one of the plurality of user devices, determine one of inquiry processing, new account processing and modify existing account processing to be performed.

5. The computer system of claim 4, wherein the intermediary computer system is further configured to, responsive to determining that inquiry processing is to be performed, access, for a selected account, policy detail data including policy limits or terms for the selected account, claims data relating to claims processed against the selected account, reinsurance data for the selected account; and billing data including invoice and payment data for the selected account.

6. The computer system of claim 1, wherein the intermediary computer system is further is further configured to communicate employing a message comprising a user identification portion, a state identification portion identifying a state associated with one of the insurance processes, a state function identification portion, a state switch indication portion and an allow next state indication portion.

7. The computer system of claim 1, wherein the intermediary computer system is configured to cause the browsers to generate a graphical user interface configured to display one of the associated interface elements associated with one of the insurance processes and simultaneously display an indication associated with each of the other insurance processes, wherein user selection of the indication causes data indicative of user selection of the insurance process associated with the indication to be provided to the intermediary computer system.

8. The computer system of claim 7, wherein the intermediary computer system is further configured to permit execution of one of the insurance processes only upon completion of a prior one of the plurality of insurance processes in a sequence, the rating process being prior to the create quote process in the sequence, and the insurance processes further comprise an account summary process, an underwriting worksheet process subsequent to the account summary process in the sequence and prior to the rating process in the sequence, a create binder process subsequent to the create quote process in the sequence, a book and bill process subsequent to the create binder process in the sequence, and an issue policy process subsequent to the book and bill process in the sequence.

9. The computer system of claim 8, wherein the interface element associated with the account summary process prompts the user for insured name and contact data, agent data and product data.

10. A computer-implemented method for processing data related to insurance, comprising:
generating instructions by an intermediary computer system to an insurance computer system to perform one of a plurality of insurance processes wherein the processes comprise a rating process and a create quote process;
communicating by the intermediary computer system via a network with a plurality of user devices having browsers maintained in a plurality of user-selected browser states, each of the browser states configured to generate an associated interface element corresponding to one of the insurance processes;
maintaining by the intermediary computer system a plurality of process states corresponding to the browser states;
receiving by the intermediary computer system data from the browsers via the network; and
permitting by the intermediary computer system the user-selected browser state only subject to permission for the corresponding insurance process to be performed.

11. The computer-implemented method of claim 10, further comprising permitting execution of one of the insurance processes only upon completion of a prior one of the plurality of insurance processes, the rating process being prior to the create quote process.

12. The computer-implemented method of claim 11, further comprising causing one of the browsers to generate a graphical user interface configured to display one of the associated interface elements associated with one of the insurance processes and simultaneously display an indication associated with each of the other insurance processes, and to receive data indicative of user selection of one of the insurance processes responsive to display of the indications.

13. The computer-implemented method of claim 10, wherein the rating process comprises defining debits or credits and calculating premium options.

14. The computer-implemented method of claim 13, wherein the create quote process comprises generating a quote letter by accessing a template quote letter from a database stored on a data storage device in communication with the intermediary computer system, invoking a word processing program including program instructions stored on a computer-readable medium to present the template quote letter on a user device, and providing a user option to select one or more premium options calculated in the rating process.

15. The computer-implemented method of claim 10, further comprising receiving data from the one or more browsers and providing the received data to the insurance computer system for storage in a database in a data storage device associated with the insurance computer system.

16. A non-transitory computer-readable medium, having computer-readable instructions stored thereon, which instructions, when executed by a processor, cause the processor to:

generate instructions to an insurance computer system to perform one of a plurality of insurance processes wherein the processes comprise a rating process and a create quote process;

communicate via a network with a plurality of user devices configured to generate browsers maintained in a plurality of user-selected browser states, each of the browser states having an associated interface element corresponding to one of the insurance processes;

maintain a plurality of process states corresponding to the browser states;

receive data from the browsers via the network; and permit the user-selected browser state only subject to permission for the corresponding insurance process to be performed.

17. The non-transitory computer-readable medium of claim 16, wherein the instructions further cause the processor to permit execution of one of the insurance processes only upon completion of a prior one of the plurality of insurance processes, the rating process being prior to the create quote process.

18. The non-transitory computer-readable medium of claim 17, wherein the insurance processes further comprise an underwriting worksheet process prior to the rating process and a create binder process subsequent to the create quote process.

19. The non-transitory computer-readable medium of claim 16, wherein the instructions further cause the processor to cause the browsers to generate a graphical user interface configured to display one of the interface elements associated with one of the insurance processes and simultaneously display an indication associated with at least one of the other insurance processes, the graphical user interface being configured to cause data indicative of user selection of the insurance process associated with the indication to be furnished to the processor responsive to user selection of the indication.

20. The non-transitory computer-readable medium of claim 16, wherein the instructions further cause the processor to execute a search of data in a database associated with the insurance computer system.

* * * * *